United States Patent [19]

Hiranuma

[11] Patent Number: 5,625,610
[45] Date of Patent: Apr. 29, 1997

[54] OPTICAL DISC DUBBING APPARATUS

[75] Inventor: Satoshi Hiranuma, Urawa, Japan

[73] Assignee: Kabushiki Kaisha Kenwood, Tokyo, Japan

[21] Appl. No.: 153,903

[22] Filed: Nov. 17, 1993

[30]    Foreign Application Priority Data

Nov. 19, 1992  [JP]   Japan .................................. 4-333571

[51] Int. Cl.$^6$ ...................................................... G11B 7/00
[52] U.S. Cl. ................................. 369/47; 369/54; 369/84
[58] Field of Search .................................. 369/32, 47, 48, 369/50, 54, 58, 83, 84; 360/15

[56]              References Cited

U.S. PATENT DOCUMENTS

| 4,823,333 | 4/1989 | Satoh et al. ......................... | 369/84 |
| 5,295,126 | 3/1994 | Okano et al. ........................ | 369/84 X |
| 5,311,492 | 5/1994 | Tabuchi et al. ..................... | 369/84 X |

FOREIGN PATENT DOCUMENTS

| 0234709 | 9/1987 | European Pat. Off. . |
| 0256508 | 2/1988 | European Pat. Off. . |

OTHER PUBLICATIONS

Patent Abstracts of Japan, vol. 14, No. 98 (P–1011) (4041) 22 Feb. 1990 & JPA–A–01 302 592.

Patent Abstracts of Japan, vol. 17, No. 66 (P–1484) 9 Feb. 1993 & JP–A–04 274 073.

Patent Abstracts of Japan, vol. 16, No. 377 (P–1401) 12 Aug. 1992 & JP–A–04 119 551.

*Primary Examiner*—W. R. Young
*Attorney, Agent, or Firm*—Sixbey, Friedman, Leedom & Ferguson; Gerald J. Ferguson, Jr.; Eric J. Robinson

[57]                ABSTRACT

Additional information for each musical program is automatically recorded on an optical disc. A digital voice signal reproduced from a mini-disc is sent to an MD system via a digital voice signal line and recorded on another mini-disc. Additional information such as the title of a musical program is sent via a serial communication line 6 to a MD control microcomputer and stored in its RAM which stores U-TOC information. The U-TOC information stored in RAM is recorded on the mini-disc before it is dismounted from the MD system.

5 Claims, 9 Drawing Sheets

OPTICAL DISC DUBBING APPARATUS

BACKGROUND OF THE INVENTION

1. Field of the Invention

The present invention relates to a dubbing apparatus for recording a signal reproduced from a recording medium on an optical disc. More particularly, the invention relates to an optical disc dubbing apparatus capable of automatically recording additional information of each musical program, capable of resuming the record operation even if an unrecorded area of an optical disc becomes absent, by erasing the already recorded track area, and capable of recording the track numbers of musical programs in the order different from the order of the reproduced musical programs.

2. Related Background Art

There is known a mini-disc (MD) which is an optical disc in which a user can write data. A mini-disc is formed with a pit information record area at the central area of the disc and a recordable area at the outer area. The recordable area includes a user's TOC (Table of Contents) area (U-TOC) and a program area. The recordable area has no pit, but a groove is engraved for the guidance to tracks. Information is recorded in the recordable area along the groove.

The groove sways like wobble. The rotation of the disc is controlled by a signal having an average frequency of 22.05 kHz and generated based on the wobble. Absolute addresses relative to the record start position are FM-modulated and recorded in the wobble.

Data record is achieved by magnetizing a magnetic film. Namely, the magnetic film is heated to a Curie point or higher by a laser spot while applying a magnetic field which reverses its polarity depending upon an input signal. The signal is therefore recorded in the magnetic film as a change in the magnetization direction. Such data record can be performed even on an already recorded area, i.e., data overwrite is possible.

The record position is managed by the information recorded in U-TOC. Recorded in the program area is information including a start time, end time, title, and the like for each track number (TNO) which is a natural number beginning with "1" and assigned to each musical program. If TNO and its additional information are erased from U-TOC, the corresponding recordable area is handled as an unrecorded area.

When an MD disc is loaded on an optical disc player, U-TOC information recorded in the MD disc is read and copied to a RAM. Thereafter, data recording/reproducing is managed by the U-TOC information stored in RAM. Each time a musical program is recorded or erased, the contents of RAM are updated and recorded in U-TOC before the disc is unloaded from the apparatus.

In erasing a musical program recorded in such a mini-disc, TNO of the program is keyed in to display it on a display screen and an erase key is depressed to delete TNO information from U-TOC area.

In dubbing the contents of an optical disc to a mini-disc, a voice output terminal of an optical disc driver is connected to a voice input terminal of a min-disc record/reproduction apparatus, and each musical program is recorded on a target mini-disc while reproducing each musical program from a source optical disc. However, additional information such as the title of each musical program recorded in the source optical disc cannot be recorded because the voice signal does not contain the additional information.

Moreover, if the unrecorded area of a mini-disc becomes absent during the record operation, the record operation is stopped once and thereafter, the already recorded area of the mini-disc is erased to resume the record operation. In this case, however, the record state becomes discontinuous at the record area where the record operation was stopped.

Furthermore, the mini-disc record/reproduction apparatus adds track numbers in the order of reproduced musical programs. It is therefore impossible to assign desired track numbers in the order different from that of reproduced musical programs.

SUMMARY OF THE INVENTION

The present invention has been made in consideration of the above circumstances. It is a principal object of the present invention to provide an optical disc dubbing apparatus capable of automatically recording additional information of each musical program in an optical disc.

It is another object of the present invention to provide an optical disc dubbing apparatus capable of continuously recording each musical program even if the unrecorded area of an optical disc under the record operation becomes absent, by erasing the already recorded track area.

It is another object of the present invention to provide an optical disc dubbing apparatus capable of assigning desired track numbers in the order different from that of reproduced musical programs.

According to one aspect of the present invention, there is provided an optical disc dubbing apparatus wherein: a digital voice signal output terminal of an optical disc reproduction apparatus for reproducing a musical program from a source optical disc having a TOC area storing the start address, end address, and additional information for each musical program is connected to a digital signal input terminal of an optical disc record apparatus for recording each musical program and the start address, end address, and additional information for each musical program in a TOC area of a target optical disc; a first microcomputer for controlling the optical disc reproduction apparatus is connected via a digital communication line to a second microcomputer for controlling the optical disc record apparatus; the second microcomputer instructs the first microcomputer to reproduce each musical program in a predetermined order, and records a digital voice signal received from the optical disc reproduction apparatus on the target optical disc; and the second microcomputer receives the additional information from the first microcomputer and stores the received additional information in a RAM, and records the start address, end address, and the additional information for each musical program stored in the RAM on a TOC area of the target optical disc before the target optical disc is dismounted from the optical disc record apparatus.

According to another aspect of the present invention, there is provided an optical disc dubbing apparatus wherein: a digital voice signal output terminal of an optical disc reproduction apparatus is connected to a digital signal input terminal of an optical disc record apparatus capable of over writing a musical program in a target optical disc; a first microcomputer for controlling the optical disc reproduction apparatus is connected via a digital communication line to a second microcomputer for controlling the optical disc record apparatus; the second microcomputer instructs the first microcomputer to reproduce each musical program, and records the digital voice signal received from the optical disc reproduction apparatus in the target optical disc; and the second microcomputer makes the optical record apparatus enter a record pause state when the second microcomputer judges that an unrecorded area of the target optical disc becomes absent, and instructs the first microcomputer to make the optical disc reproduction apparatus enter a reproduction pause state at the data position when the record was intercepted, whereby after a user erases a desired recorded track area of the target optical disc, the reproduction and record are resumed to continue the record at the erased recorded track area.

According to a further aspect of the present invention, there is provided an optical disc dubbing apparatus wherein: a voice signal output terminal of a recording medium reproduction apparatus is connected to a signal input terminal of an optical disc record apparatus; a first microcomputer for controlling the recording medium reproduction apparatus is connected via a digital communication line to a second microcomputer for controlling the optical disc record apparatus; when a user designates a desired order of track numbers of musical programs to be recorded, supplies the desired order to the second microcomputer, and instructs to record, the second microcomputer instructs the first microcomputer to reproduce each musical program from the source recording medium, and records the voice signal received from the recording medium reproduction apparatus on a target optical disc; and the second microcomputer stores the designated track number added to each recorded musical program in a RAM, and records the designated track number added to each recorded musical program on a TOC area of the target optical disc.

According to the optical disc dubbing apparatus of the present invention capable of recording additional information of each musical program in a target optical disc, when the second microcomputer detects a change in the reproduction track number based on a sub-code contained in the digital voice signal sent from an optical reproduction apparatus, the second microcomputer sends an additional information transmission instruction to the first microcomputer. Upon reception of the instruction, the first microcomputer reads the additional information of the previously reproduced track number from a RAM which stores the TOC information, and transmits it to the second microcomputer.

Upon reception of the additional information of the previously reproduced track number, the second microcomputer stores it as well as the corresponding track number in its RAM. The additional information of each musical program and the track number recorded in the above manner stored in the RAM is recorded in the TOC area of the target optical disc before it is dismounted from the optical disc record apparatus.

According to the optical disc dubbing apparatus of the present invention capable of continuously recording each musical program even if the unrecorded track area of a target optical disc under the record operation becomes absent, by erasing the already recorded track area, when the second microcomputer judges from the address of a presently recorded area and the TOC information stored in the RAM that the unrecorded area becomes absent, the second microcomputer makes the first microcomputer enter a pause state at the area under the reproduction operation to thereby allow a user to erase the already recorded area of the target optical disc.

In the pause state, when the user erases the already recorded area of the target optical disc and depresses a record key, the second microcomputer instructs the first microcomputer to start the reproduction from the track pause position and makes the optical disc record apparatus start the record of the musical program from the erased recorded area. The record data in the target disc becomes continuous because the data read address read from a shock proof memory of the optical disc record apparatus when the record operation resumes is managed to be continuous.

Although the record areas become discontinuous, the link state between the record areas is stored as the TOC information in RAM and recorded in the TOC area before the optical disc is dismounted from the apparatus. The data in the target optical disc can therefore be reproduced continuously.

According to the optical disc dubbing apparatus of the present invention capable of recording the track numbers of musical programs in the desired order different from that of the reproduced musical programs, the data reproduction from a recording medium and the data record in a target optical disc are continuously performed so that the record time will not become longer than the normal reproduction time. Furthermore, since the track numbers of musical programs can be assigned in a desired order different from that of the reproduced musical programs, the musical programs recorded in the target optical disc can be reproduced in the desired order.

DETAILED DESCRIPTION OF THE PREFERRED EMBODIMENTS

Figure 1A:
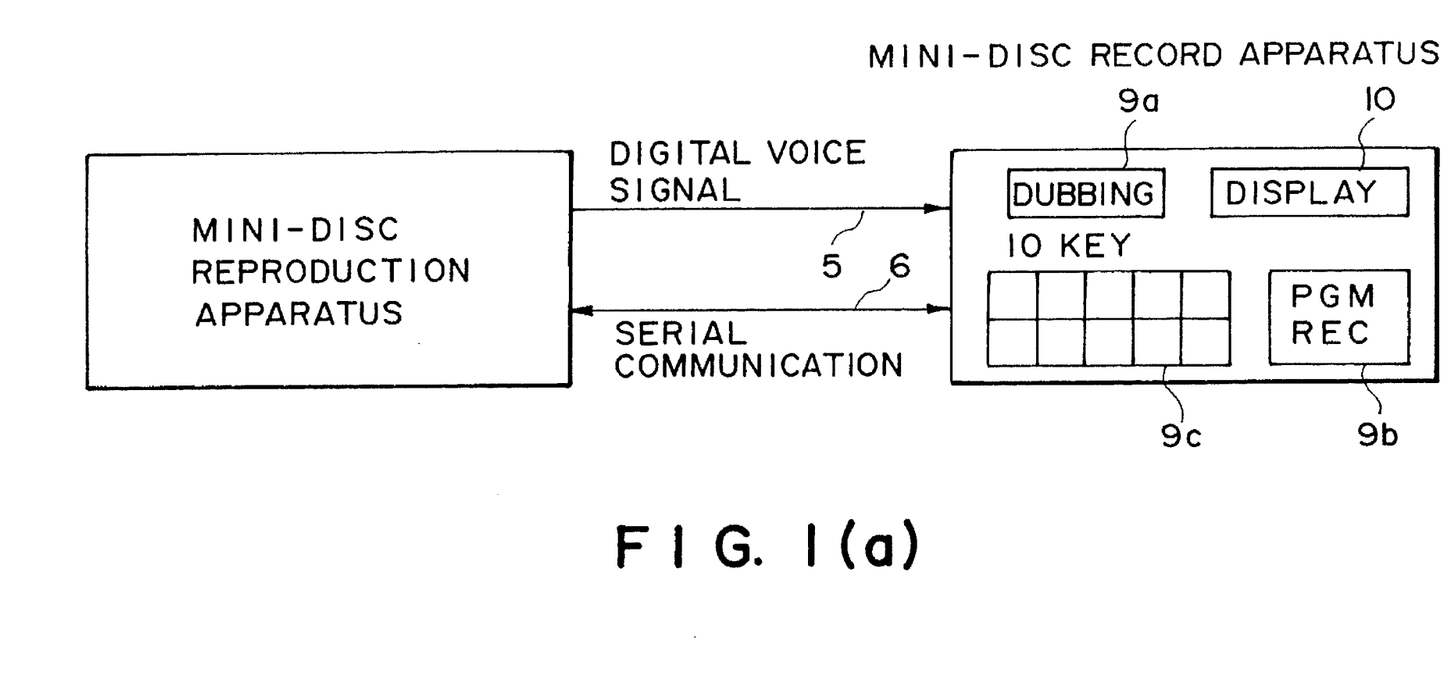
FIG. 1A shows the fundamental structure of an optical disc dubbing apparatus according to a first embodiment of the present invention.

An optical disc dubbing apparatus according to the first embodiment of the present invention will be described with reference to the accompanying drawings. As shown in FIG. 1A, the dubbing apparatus is constructed of a mini-disc reproduction apparatus and a mini-disc record apparatus which are connected by a digital voice signal line 5 and a serial communication line 6.

Figure 1B:
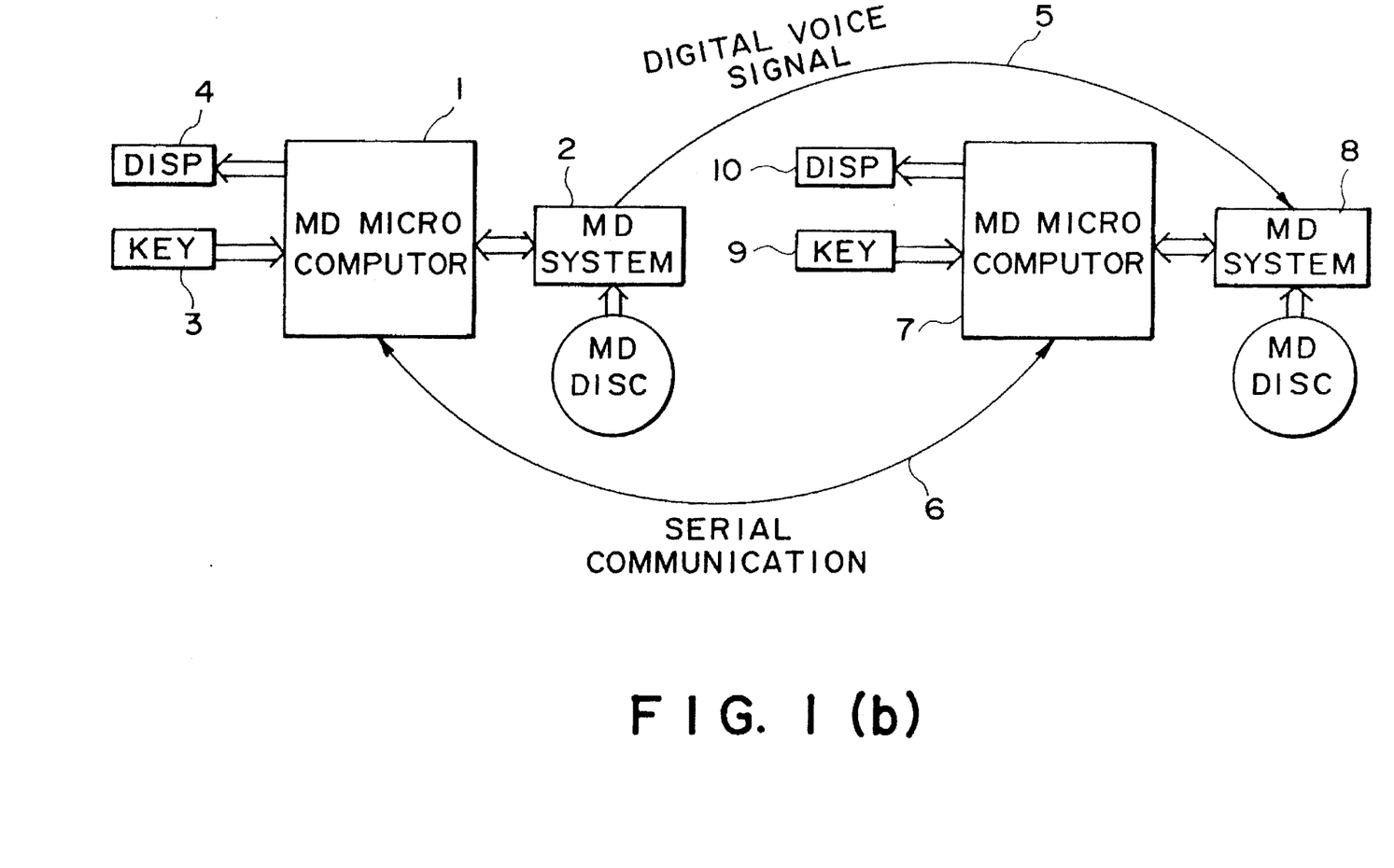
FIG. 1B is a schematic block diagram showing the structure of the dubbing apparatus of the first embodiment.

As shown in FIG. 1B, the mini-disc reproduction apparatus is constructed of an MD control microcomputer 1, an MD system 2, a key pad 3, and a display unit 4.

The MD system 2 has an MD mechanism, a servo system, a signal processor, a shock proof memory, a D/A converter, an A/D converter, and the like, for the mechanical control of a mini-disc (MD) and for the signal read/write. The MD system 2 is controlled by the MD control microcomputer 1 and transfers an address and sub-code signal to and from the MD control microcomputer 1.

A user enters an instruction from the key pad 3 to the MD control microcomputer 1 like a usual MD control microcomputer. The MD control microcomputer 1 supplies data to the display unit 4 to display it on the screen, and transfers data to and from the serial communication line 6.

The mini-disc record apparatus is constructed of an MD control microcomputer 7, an MD system 8, a key pad 9, and a display unit 10.

The MD system 8 has an MD mechanism, a servo system, a signal processor, a shock proof memory, a D/A converter, an A/D converter, and the like, for the mechanical control of a mini-disc (MD) and for the signal read/write. The MD system 8 is controlled by the MD control microcomputer 7 and transfers an address and sub-code signal of an mini-disc to and from the MD control microcomputer 7.

A user enters an instruction from the key pad 9 to the MD control microcomputer 7. The MD control microcomputer 7 supplies data to the display unit 10 to display it on the screen, and transfers data to and from the serial communication line 6.

As shown in FIG. 1A, the key pad 9 has a dubbing key 9a, a program record key 9b, and ten-keys 9c.

A digital voice signal output terminal of the MD system 2 is connected to a digital voice signal input terminal of the MD system 8. A voice signal reproduced from an MD disc loaded on the MD system 2 is recorded on an MD disc loaded on the MD system 8.

Figure 2:
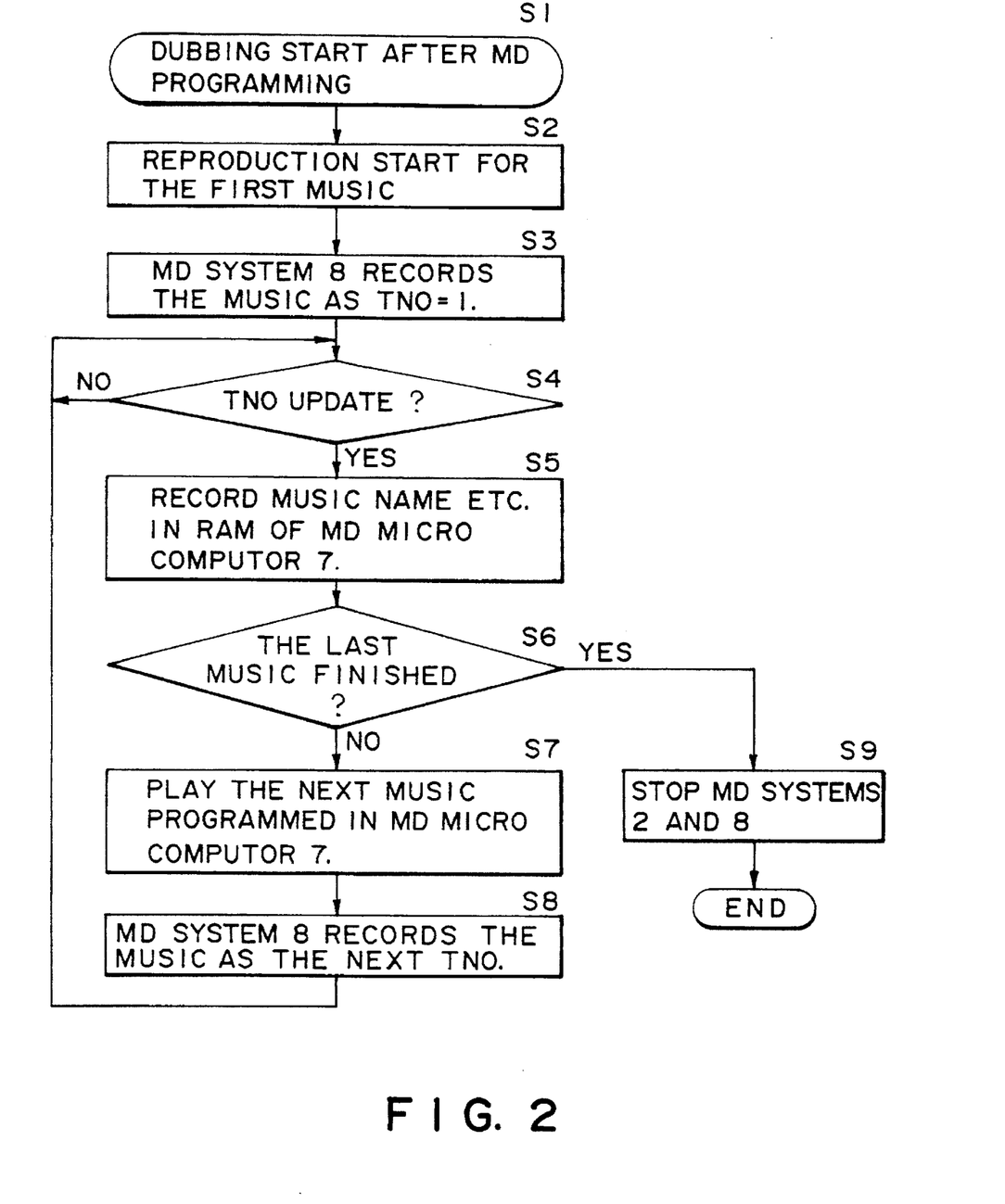
FIG. 2 is a flow chart explaining the operation of the dubbing apparatus of the first embodiment.

The operation of the dubbing apparatus will be described with reference to FIG. 2. At Step S1, the program record key 9b is depressed to enter a program record mode. In the program record mode, musical program numbers and the order of the musical programs to be reproduced by the MD system 2 are entered by using the ten-keys 9c. After this setting, the dubbing key 9a is depressed to start dubbing at Step S2.

At Step S2, the MD control microcomputer 7 instructs the MD control microcomputer 1 to reproduce the first musical program set in the program record mode, and also instructs the MD system 8 to record the digital voice signal inputted to the MD system 8 as TNO-1. At Step S3, the first musical program starts recording.

At Step S4, a change in TNO is monitored from a Q code included in the digital voice signal. When a change in TNO is detected, the operation advances to Step S5 whereat the MD control microcomputer 7 instructs the MD control microcomputer 1 to send additional information such as the title of the reproduced first musical program, and stores the received additional information into an U-TOC information storage RAM.

At Step S6, it is checked whether the last musical program has been reproduced and recorded. If produced and recorded, at Step S9 the MD systems 2 and 8 are turned off to terminate the dubbing operation.

If the last musical program has not been reproduced and recorded, at Step S7 the MD control microcomputer 7 instructs the MD control microcomputer 1 to reproduce the next musical program set in the program record mode, and also instructs the MD system 8 to record the digital voice signal inputted to the MD system 8 as TNO-2. At Step S8, the next musical program starts recording, and the operation returns to Step S4.

The embodiment constructed as above is not limitative. For example, the mini-disc reproduction and record apparatuses may be housed within a single case.

Figure 3A:
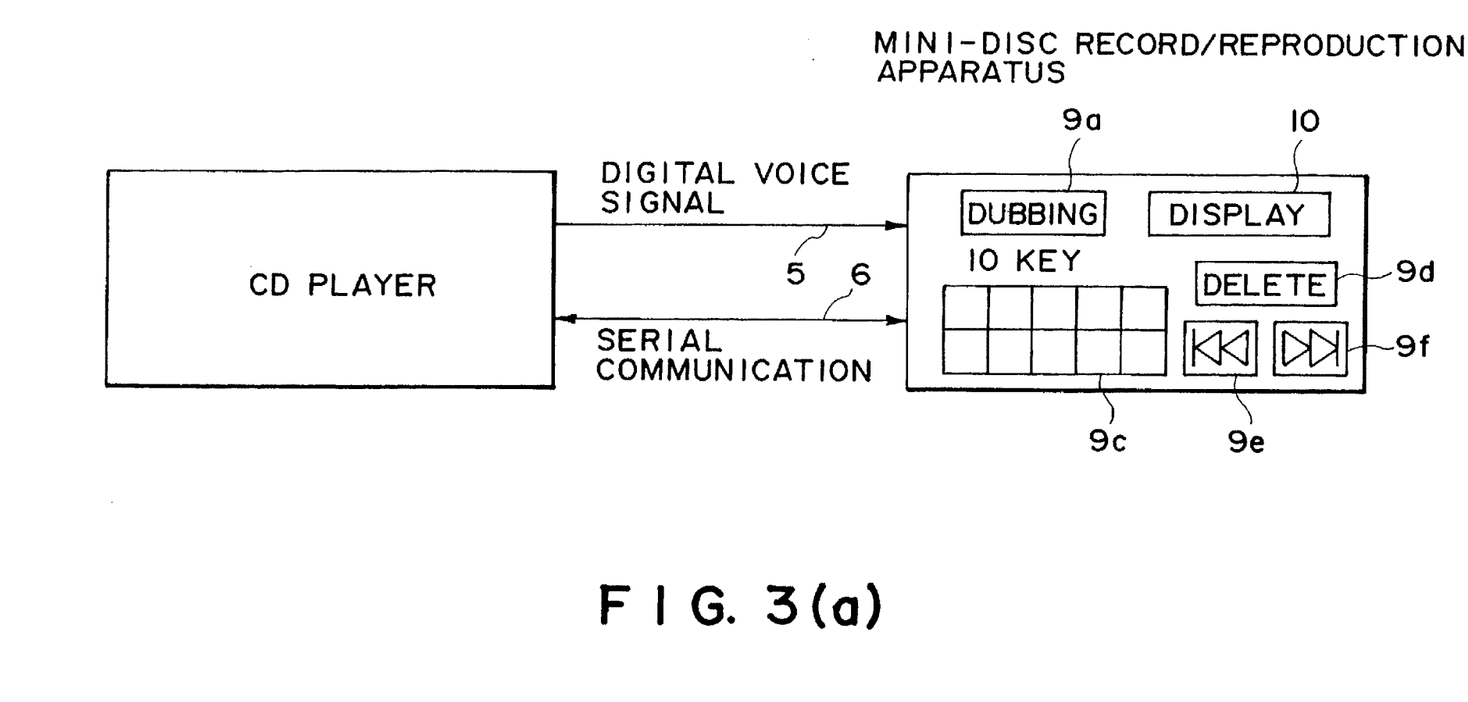
FIG. 3A shows the fundamental structure of an optical disc dubbing apparatus according to a second embodiment of the present invention.

An optical disc dubbing apparatus according to the second embodiment of the present invention will be described. As shown in FIG. 3A, the dubbing apparatus is constructed of a CD player and a mini-disc record/reproduction apparatus which are connected by a digital voice signal line 5 and a serial communication line 6.

Figure 3B:
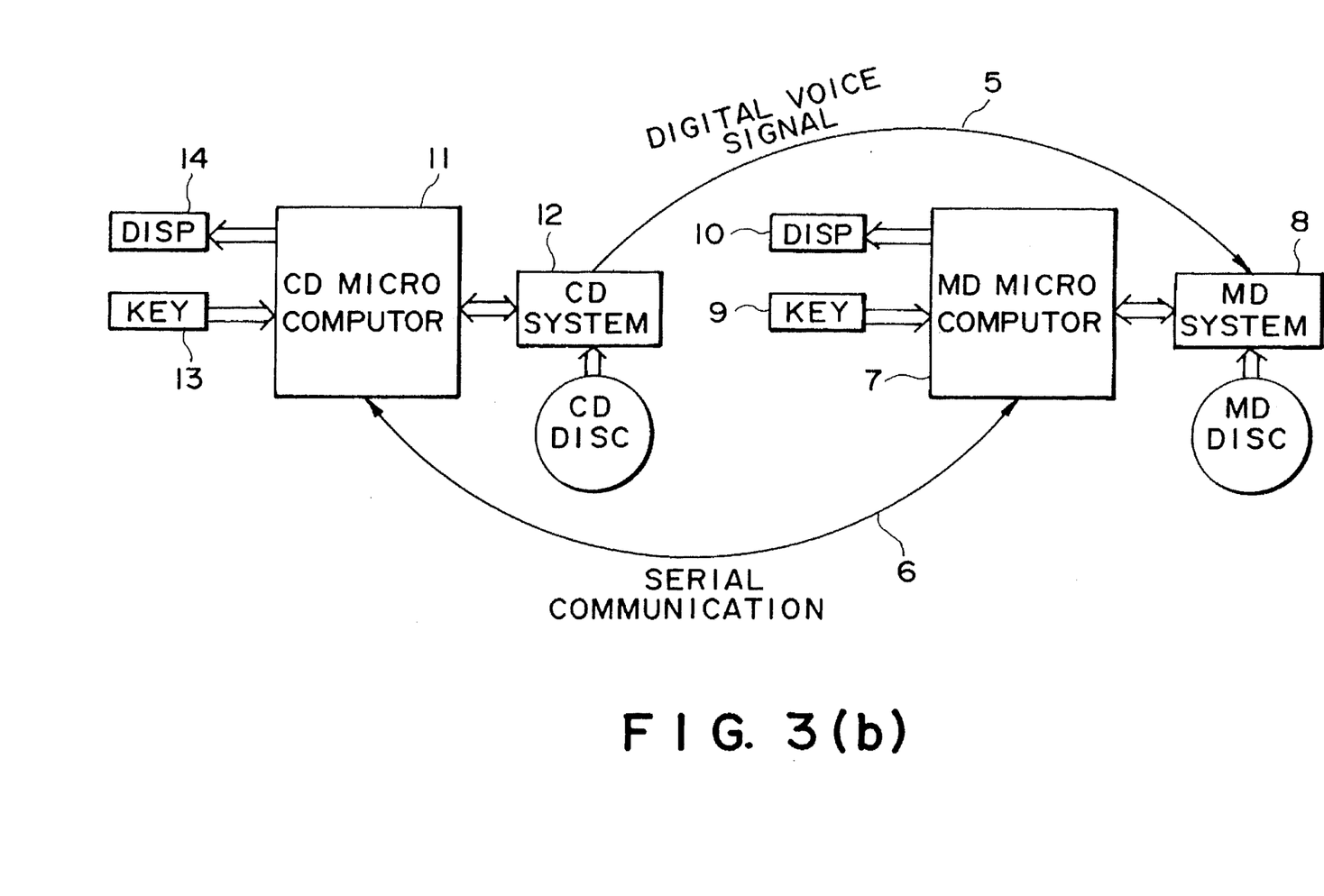
FIG. 3B is a schematic block diagram showing the structure of the dubbing apparatus of the second embodiment.

As shown in FIG. 3B, the CD player is constructed of an CD control microcomputer 11, a CD system 12, a key pad 13, and a display unit 14.

A user enters an instruction from the key pad 13 to the CD control microcomputer 11 like a usual CD control microcomputer. The CD control microcomputer 11 supplies data to the display unit 14 to display it on the screen, and transfers data to and from the serial communication line 6.

The CD system 12 has a CD mechanism, a servo system, a signal processor, a D/A converter, an A/D converter, and the like, for the mechanical control of a compact disc (CD) and for the signal read. The CD system 12 is controlled by the CD control microcomputer 11 and transfers an address and sub-code signal of a CD to and from the CD control microcomputer 11.

The mini-disc record apparatus is fundamentally the same as the first embodiment. However, in addition to the dubbing key 9a, display key 10, and ten-keys 9c, the key pad 9 has a delete key 9d, an up-key 9f, and a down-key 9e.

A digital voice signal output terminal of the CD system 12 is connected to a digital voice signal input terminal of the MD system 8. A voice signal reproduced from a CD disc loaded on the CD system 12 is recorded on an MD disc loaded on the MD system 8.

Figure 4:
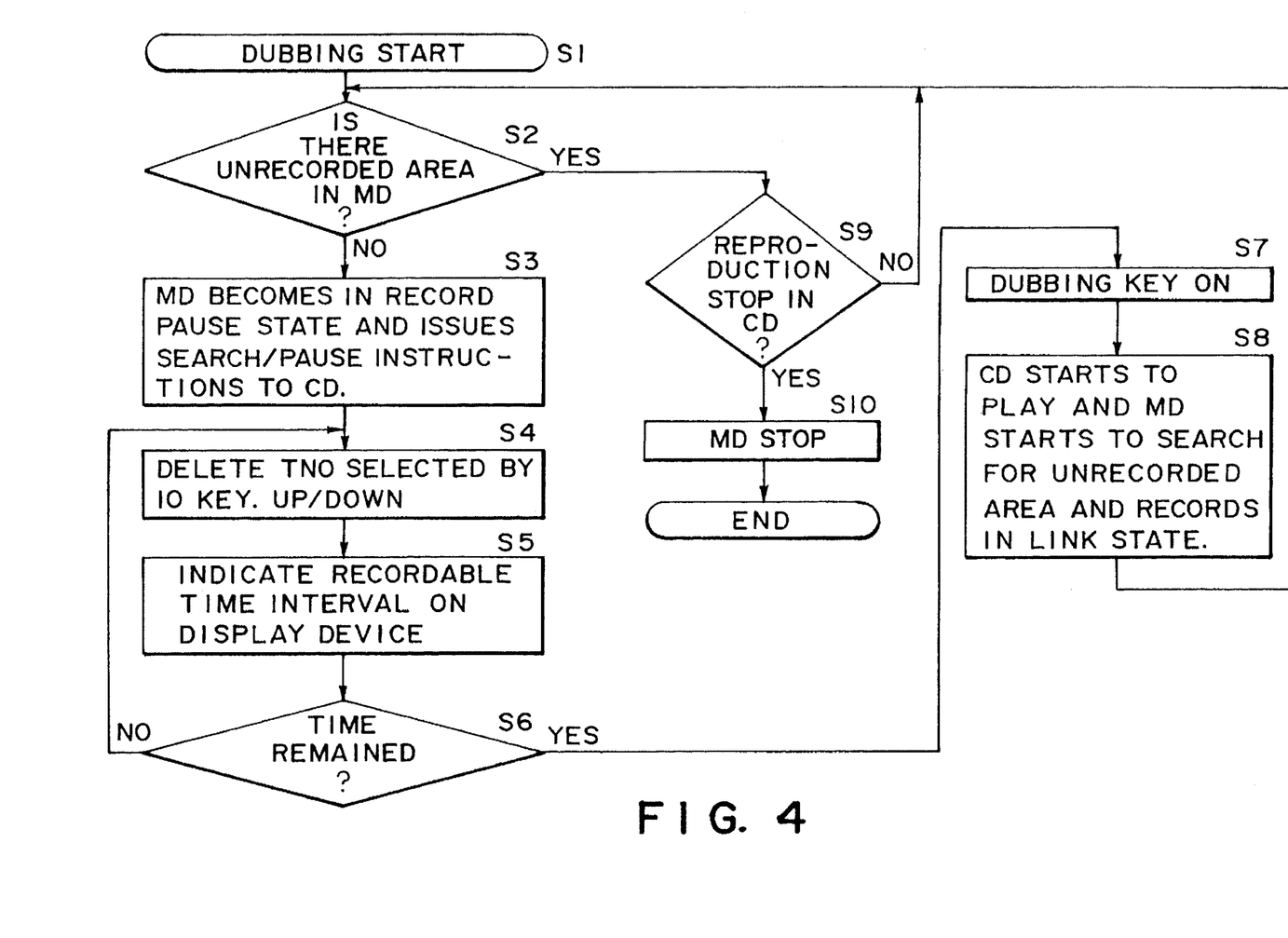
FIG. 4 is a flow chart explaining the operation of the dubbing apparatus of the second embodiment.

The operation of the dubbing apparatus will be described with reference to FIG. 4. At Step S1, upon depression of the dubbing key 9a, the MD control microcomputer 7 instructs the CD control microcomputer 11 to reproduce musical programs starting from the first musical program, and also instructs the MD system 8 to record the digital voice signal inputted to the MD system 8, to thereby starts dubbing.

At Step S2, the MD control microcomputer 7 checks, based on the contents of a RAM which stores the record addresses and U-TOC information, whether there is still an unrecorded area of the mini-disc. If there is an unrecorded area, at Step S9 it is checked whether the CD reproduction has stopped. If not, Step S2 is repeated, whereas if stopped, at Step S10 the MD system 8 is turned off to terminate the dubbing.

If it is judged at Step S2 that there is no unrecorded area, at Step S3 the MD control microcomputer 7 makes the MD system 8 enter a record pause state, and instructs the CD control microcomputer 11 to set a reproduction pause state at the data position when the record pause state was effected, by designating the data position by a received Q code. A representation "FULL" is displayed on the display unit 10 to inform the user of the full state.

At Step S4, a user designates TNO of an unnecessary recorded musical program by using the up-key 9f and/or down-key 9e to delete the unnecessary musical program. When TNO is designated, the time and title of the musical program are displayed for the confirmation of deletion by the user.

At Step S5, a recordable time is displayed on the display unit 10. At Step S6, the user judges whether the recordable time is sufficient or not. If judged as sufficient, at Step S7 the dubbing key 9a is depressed. At Step S8 the CD system 12 searches the unrecorded area and resumes the reproduction from where the reproduction was intercepted. The link between the record interception address and the record start address is stored in RAM.

If the user judges the recordable time as insufficient at Step S6, the operation from Step S4 is again repeated.

The embodiment constructed as above is not limitative. For example, the CD player and the mini-disc record/reproduction apparatus may be housed within a single case, or a mini-disc record/reproduction apparatus may be used in place of the CD player. Furthermore, instead of the user judgement of the recordable time, a reproduction remaining time may be transmitted from the CD player to the MD control microcomputer 7 to allow the MD control microcomputer 7 to judge and automatically resume the dubbing.

Figure 5A:
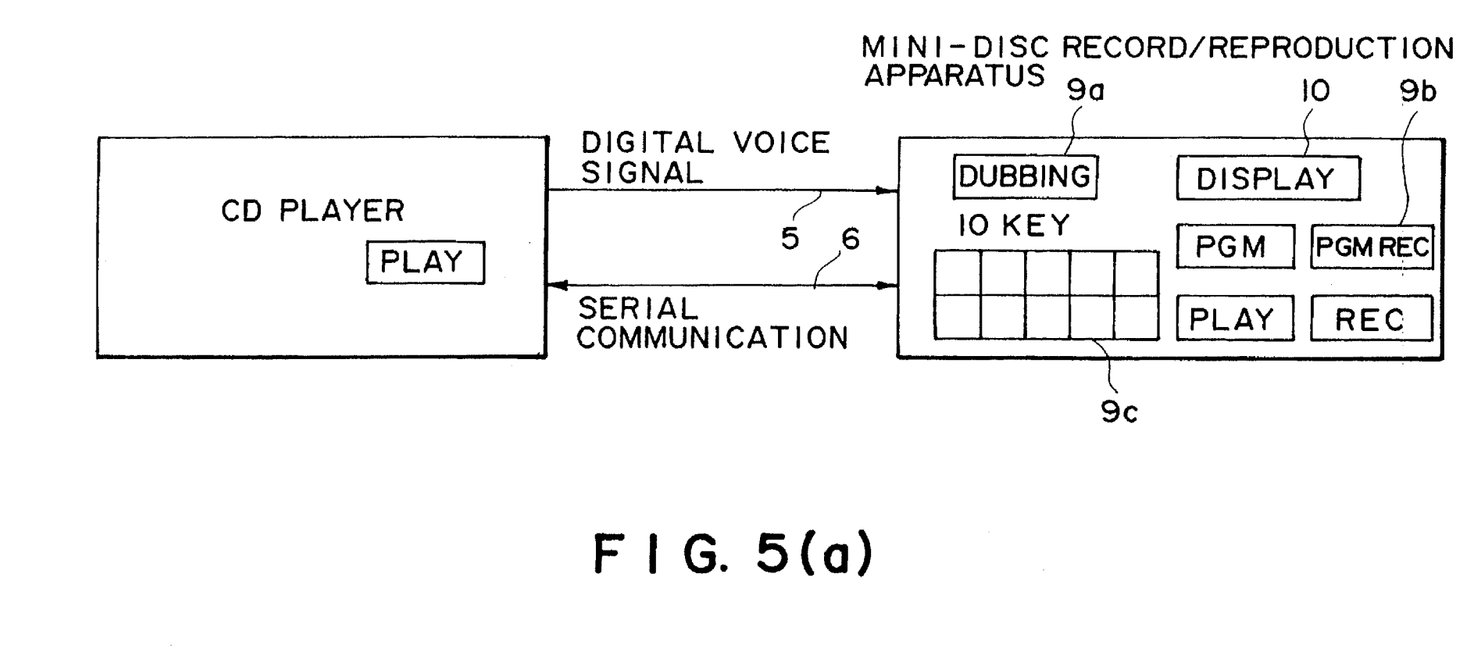
FIG. 5A shows the fundamental structure of an optical disc dubbing apparatus according to a third embodiment of the present invention.
Figure 5B:
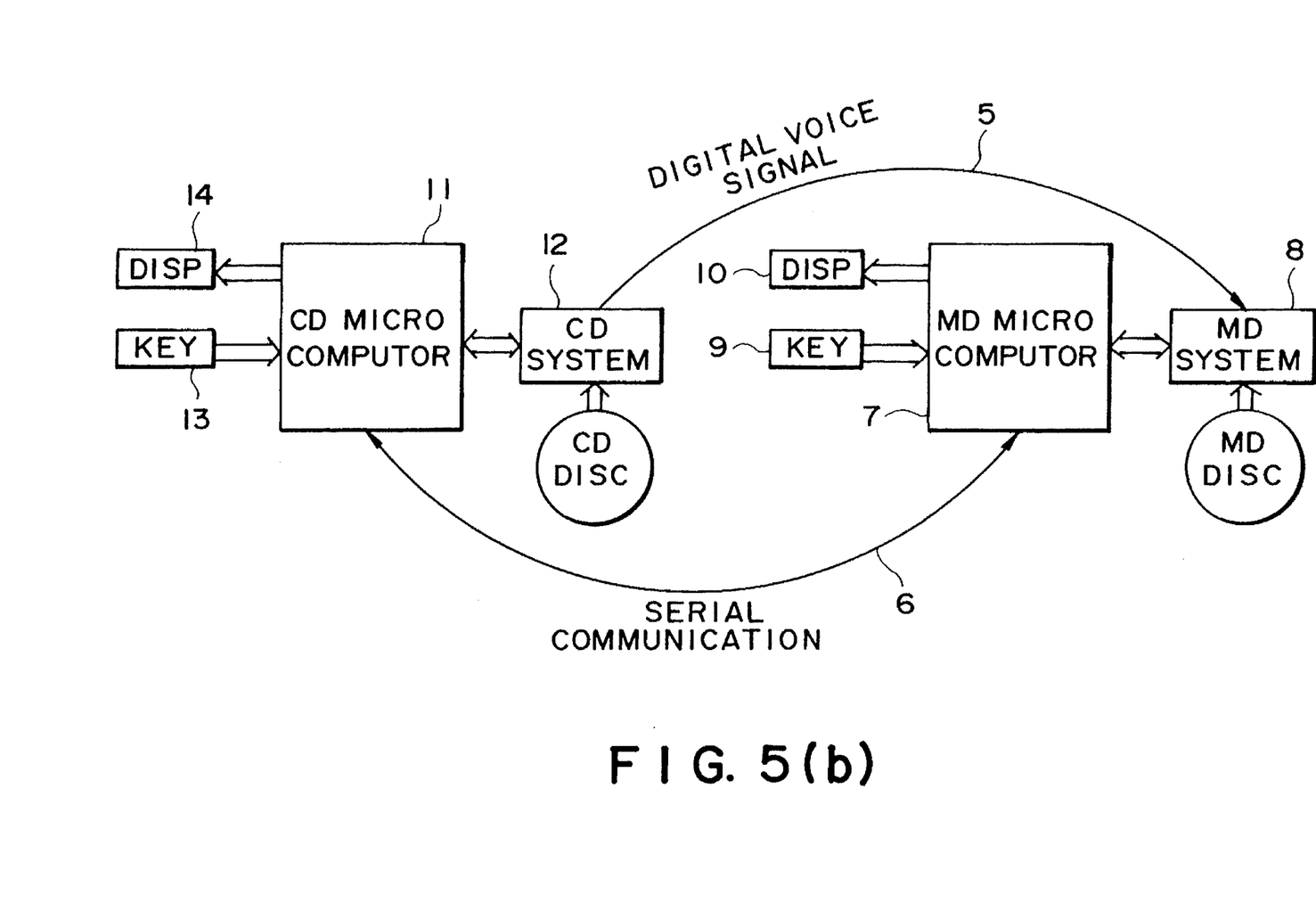
FIG. 5B is a schematic block diagram showing the structure of the dubbing apparatus of the third embodiment.

An optical disc dubbing apparatus according to the third embodiment of the present invention will be described. As shown in FIG. 5A and 5B, the structure of the dubbing apparatus of this embodiment is fundamentally the same as that of the second embodiment. However, the key pad 9 is added with a program record key 9b.

Figure 6:
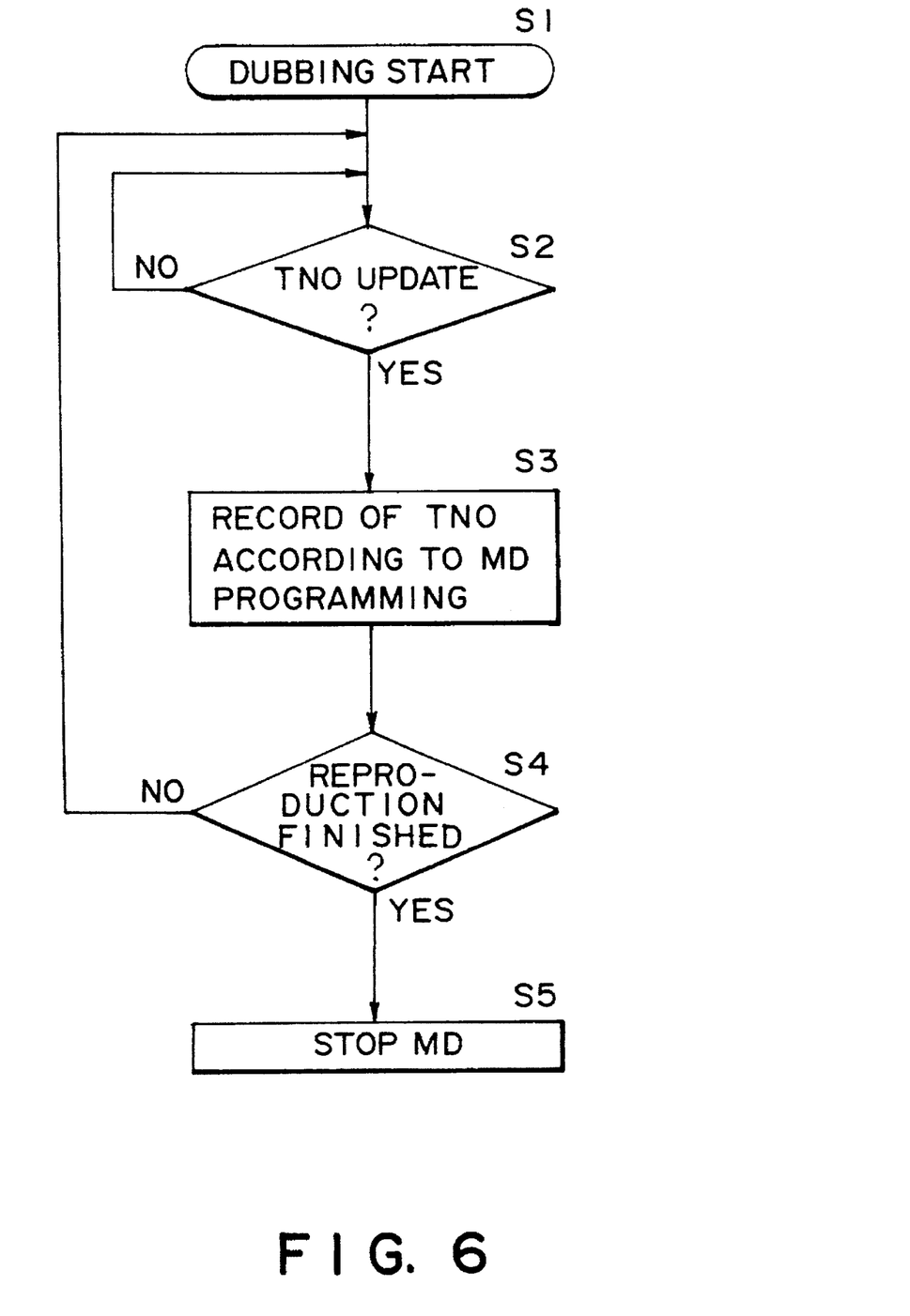
FIG. 6 is a flow chart explaining the operation of the dubbing apparatus of the third embodiment.

The operation of the dubbing apparatus of this embodiment will be described with reference to FIG. 6. First, TNOs to be added to a mini-disc are designated in the sequential order of musical programs to be dubbed. TNOs to be added to a mini-disc can be designated by depressing the program record key 9b and then depressing the ten-keys 9c.

At Step S1, upon depression of the dubbing key 9a, the CD player reproduces musical programs starting from TNO-1. The MD system 8 records the digital voice signal to dub it.

At Step S2, a change in TNO is monitored by detecting a sub-code included in the digital voice signal. In the case of a new TNO, at Step S3, TNO to be added to the mini-disc is changed to TNO next designated by the program key and ten-keys. If the order of TNOs is not designated, TNOs to be added to a mini-disc is in the ascending order of natural numbers starting from "1".

At Step S4 it is checked whether the reproduction has been completed. If completed, at Step S5 the MD system is turned off to terminate the dubbing, whereas if not completed, the operation from Step S2 is repeated.

For example, if the order of TNOs designated by the program key and ten-keys is "3", "4", "2", "1", and "5", the musical programs TNO-1, TNO-2, TNO-3, TNO-4, and TNO-5 of the source compact disc are recorded as TNO-3, TNO-4, TNO-2, TNO-1, and TNO-5 which are reproduced starting from TNO-1 as the user desired.

The embodiment constructed as above is not limitative. For example, as the source CD player, a DAT, a cassette recorder, a mini-disc record/reproduction apparatus, and the like may be used. In the case of a cassette recorder, an analog voice signal is used. In this case, a renewal of TNO may be made when the level of a monitored analog voice signal continues to be lower than a predetermined level for a predetermined period and thereafter changes to the predetermined level.

According to the optical disc dubbing apparatus of the present invention, additional information of each musical program can be automatically recorded on an optical disc.

Even if the unrecorded area becomes absent during the recording, the recording can be resumed by erasing the recorded tracks. Accordingly, even if the disc becomes full during the dubbing, it is not necessary to start the dubbing from the beginning.

Furthermore, the track numbers of musical programs to be reproduced can be arranged as desired, allowing to obtain an optical disc having a desired track number order without the program reproduction of a source disc. Still further, it is not necessary to search a musical program during the dubbing, preventing intercepted sounds and reducing the record time. If a DAT is used as the source medium, the record time can be reduced considerably.

What is claimed is:

1. An optical disc dubbing apparatus wherein:

a voice signal output terminal of an optical disc reproduction apparatus for transmitting a musical program signal reproduced from a source optical disc in the optical disc reproduction apparatus, the source optical disc having a TOC area storing the start address, end address, and additional information of musical program name for each musical program, is connected to a voice signal input terminal of an optical disc record apparatus for receiving each musical program signal transmitted from the optical disc reproduction apparatus which records the received musical program in a target optical disc, the target optical disc having a TOC area storing the start address, end address, and additional information of musical program name for each musical program;

a first microcomputer for controlling said optical disc reproduction apparatus is connected via a single communication line of serially transmitting a sequence of bits in data output from the first microcomputer to a second microcomputer for controlling said optical disc record apparatus;

said second microcomputer in response to a detection of change in a track number (TNO) during the reproduction of the source optical disc receives the additional information of musical program name for the last recorded musical program as a serial bit sequence through the single communication line from said first microcomputer and stores the received additional information of musical program name in a RAM as a program name for the last recorded musical program, and records the start address and end address for recording each musical program, together with the additional information of musical program name for each musical program stored in said RAM on the TOC area of said target optical disc before said target optical disc is dismounted from said optical disc record apparatus.

2. An optical disc dubbing apparatus according to claim 1, wherein said second microcomputer instructs said first microcomputer to reproduce each musical program in a predetermined order of track numbers (TNO).

3. An optical disc dubbing apparatus according to claim 1, wherein said second microcomputer records the start address and end address for recording each musical program with the additional information for each musical program stored in said RAM on a TOC area of said target optical disc before said target optical disc is dismounted from said optical disc record apparatus.

4. An optical disc dubbing apparatus according to claim 1, wherein said detection of change is made by monitoring data code in the musical program signal.

5. An optical disc dubbing apparatus according to claim 4, wherein said second microcomputer detects the change in the track number (TNO) by monitoring the data code in the musical program signal and instructs said first microcomputer to send the additional information for musical program recording completion.

* * * * *